United States Patent [19]

Claes et al.

[11] 4,144,040

[45] Mar. 13, 1979

[54] METHOD AND APPARATUS FOR DEMISTING GASES

[75] Inventors: Jozef Claes, Balen; Roger De Bruyne, Zulte, both of Belgium

[73] Assignee: N.V. Bakaert S.A., Zwevegem, Belgium

[21] Appl. No.: 722,614

[22] Filed: Sep. 13, 1976

[30] Foreign Application Priority Data

Sep. 12, 1975 [BE] Belgium ................. 159966

[51] Int. Cl.² .................................. B01D 46/00
[52] U.S. Cl. ............................ 55/97; 55/487; 55/498; 55/527; 55/466
[58] Field of Search ............. 55/97, 185, 259, 466, 55/486–488, 498, 500, 525–528

[56] References Cited

U.S. PATENT DOCUMENTS

| | | | |
|---|---|---|---|
| 2,230,278 | 2/1941 | Walton | 55/487 |
| 2,933,154 | 4/1960 | Lauterbach | 55/486 |
| 3,066,462 | 12/1962 | Yap et al. | 55/97 |
| 3,208,205 | 9/1965 | Harms et al. | 55/487 |
| 3,352,778 | 11/1967 | Brink, Jr. | 55/185 |
| 3,708,965 | 1/1973 | Domnick | 55/488 |
| 3,745,748 | 7/1973 | Goldfield | 55/97 |
| 3,873,281 | 3/1975 | Himes et al. | 55/97 |
| 4,050,237 | 9/1977 | Pall et al. | 55/486 |

FOREIGN PATENT DOCUMENTS

2510225  10/1975  Fed. Rep. of Germany ............ 55/486

Primary Examiner—Bernard Nozick
Attorney, Agent, or Firm—Shlesinger, Arkwright, Garvey & Dinsmore

[57] ABSTRACT

Method and apparatus for demisting gases wherein a stream of gas containing submicron liquid particles is caused to pass through a filter material comprising at least in part a material having a porosity of at least 0.985.

21 Claims, 15 Drawing Figures

METHOD AND APPARATUS FOR DEMISTING GASES

The present invention relates to a novel method and apparatus for demisting streams of gases.

Gas filtration is very common in industry and usually aims at the at least partial elimination of solid or liquid particles from the gas stream (herein termed dedusting or demisting). At some stage in many industrial processes it is often desirable to treat the process gases, for example, to improve the purity thereof or to remove commercially valuable materials therefrom. Thus, for example, spent gases from combustion or drying installations, ventilation gases from dusty workshops and waste gases from heavy organic basic chemistry are frequently loaded with soot, dust or harmful liquid particles and generally require treatment prior to discharge.

So far as liquid particles are concerned, the formation of droplets in a gas stream is governed by factors such as the specific flow conditions, the degree of saturation of the gas stream, temperature, the presence of solid particles (condensation nuclei), and, where there is direct contact with liquid phase, the contact pattern and local gas velocity. The point at which liquid droplets condense from the vapor phase (atmospheric mist formation) due to a sudden change in temperature and/or pressure, or the entrainment of droplets in a saturated gas is very critical.

For particles not exceeding 1 micron, conventional separation techniques such as for example, cyclones and spray catches are generally unsatisfactory, so that an additional filtration step is necessary.

In general, important requirements for a demisting step to be carried out on gases are low operating costs combined with high filtering and capture efficiency. In gas filtration, particularly demisting, the provision of a filter unit in the gas stream inherently results in a pressure drop, which increases operating costs. For example, a ventilator requires supplementary power of 0.07 $W\,h^{-1}\,m^{-3}$ for every pressure drop increase of 25 mm $H_2O$. The pressure drop across the demisting unit should therefore remain as low as possible at an industrially acceptable minimum gas velocity together with the maximum possible capture efficiency.

Particularly when the mist to be filtered out contains a considerable amount of submicron particles, such as for example in the preparation of sulphuric acid, it is essential that the gas stream which is being filtered should remain in the filter for at least a certain minimum length of time. Indeed, the submicron particle capture mechanism is based upon diffusion of these particles from the gas stream to the filter mass which may for example, be composed of fibers. This diffusion is based upon the Brownian movement of the very small particles in the gas stream and requires a certain contact time to allow migration of the particles to the filter fibres. Thus, the applied gas flow rate generally cannot rise above a certain value without the need for a corresponding increase in the filter thickness which would result not only in high installation costs but also in higher operating costs since the pressure drop (and consequent energy loss) in the gas stream would be increased.

The demisting filters currently used for submicron particles generally contain glass fibre mats as a filter medium but these filters suffer from the disadvantage that they tend to produce a considerable increase in pressure drop at the gas flow rates conventionally used for this kind of filtration and for the desired high capture efficiencies. This is probably due to the low porosity of the filters, the pores of which tend to become rapidly obstructed with liquid, resulting in a rapid increase in the pressure drop. Moreover, after some time, the liquid accumulated in the pores may be entrained by the gas stream at the filter exit, thereby reducing capture efficiency. Obviously the filter pores will become obstructed according to the degree to which the fibres are susceptible to moistening by the liquid to be captured. When the fibres are susceptible to moistening, a liquid film will build up very rapidly at the fibre surfaces, resulting in a rapid reduction of the free pore volume. As a remedy, it has been proposed to use hydrophobic or oleophobic fibres, generally liquid repellant fibres e.g. siliconized glass fibres and polyester or polypropylene fibres. Liquid film formation is thus avoided and the pore volume is maintained, but there is still the disadvantage that the fibres, because of their liquid repellant nature, have more difficulty in holding the droplets captured so that the likelihood of entrainment rises.

It is an object of the present invention to provide a new and advantageous method and apparatus for filtering gases by the at least partial elimination of liquid particles therein.

According to one feature of the present invention we provide filtration apparatus for the removal of liquid particles from a stream of gas, comprising filtration means containing a filter material composed at least in part of material having a porosity of at least 0.985, means for passing a stream of gas containing liquid particles through said filtration means and means for removing from said filtration means the said stream of gas from which at least a portion of the said liquid particles have been removed.

The above-described apparatus according to the invention advantageously contains means for removing from the filtration means the liquid from the particles filtered off by the filter material.

According to a further feature of the present invention we provide a method of filtering a stream of gas containing liquid particles which comprises passing the stream through a filter material composed at least in part of material having a porosity of at least 0.985, whereby at least a portion of the said liquid particles are removed from the gas stream.

It will be appreciated that when the stream of gas to be filtered contains solid particles as well as liquid particles, the former will also be captured by the above-mentioned filter material and, in this case, the method and apparatus according to the invention will effect dedusting as well as demisting of streams of gases.

The porosity of the filter material may be determined, for example, in the manner illustrated below.

Thus, for example, the thickness of a stainless steel fibre web having a surface of 1 $m^2$ and a weight of 288 $g/m^2$ was determined at a number of points (for example 20 points) and the average thickness, calculated as 7.75 mm. The volume of the fibre web is thus 0.775 cm × 10,000 $cm^2$ = 7,750 $cm^3$ giving a density of 288/7,750 = 0.0372 $g/cm^3$. The density of solid stainless steel is 7.8 $g/cm^3$ and the relative density ($\delta$) of the web is thus 0.0372/7.8 = 0.00475. The porosity ($\epsilon$) of the web corresponds to 1 − $\delta$, i.e. 0.99525.

The apparatus and method according to the invention are particularly useful for the removal of liquid particles having a size of less than 1 micron from the gas stream.

By means of the present invention, we have been able to effect demisting of gas streams with the aid of filter materials which are moistened by the captured liquid particles, thereby improving the capture potential of the filter material, but which do not suffer from the normally associated disadvantage of pore obstruction, thereby avoiding excessive increases in pressure drop and entrainment of the liquid particles. Pore obstruction is minimized in the filter materials employed in accordance with the present invention by their initially very high porosity.

In principle, the above-mentioned filter material may be composed of any suitable material having the specified degree of porosity. However, preferably the filter material is composed of a web of fibres which are advantageously randomly orientated. Such fibre webs may be composed of either continuous or staple fibres, the fibre diameters preferably being greater than 1 $\mu$m but not exceeding 50 $\mu$m, advantageously not exceeding 10 $\mu$m. We have found that with a comparable and lower filter thickness than those of conventional demisting filters, we have achieved comparable capture efficiencies at comparable gas flow rates but with pressure drops which are less than a fifth of those obtained with conventional filters.

In order to increase the capture efficiency and to reduce the pressure drop loss across the filter material it has also proved advantageous, particularly for filtering polydisperse aerosols, to employ a plurality of superposed fibre webs as the filter material, whereby the fibre diameter in the successive fibre webs decreases downstream from one layer to another. It is generally recognized that the effective capture efficiency of a fibre for submicron particles increases with decreasing fibre diameter.

It has also proved particularly advantageous — and this represents an important feature of the present invention — to use metal fibres, particularly stainless steel fibres with a rough surface — as a filter material. These fibres have a good resistance to corrosion, which renders them particularly suitable for filtering corrosive gas streams at either high or low temperature. Moreover, owing to their rough surface, these fibres can be easily felted in a gas or liquid suspension into coherent, self-supporting fibre webs in which the fibres are randomly oriented. The fibrous webs employed in the present invention preferably have an even or uniform porosity of at least 0.99 advantageously at least 0.995. In some cases it may be desirable to adjust the porosity of the material, for example, by needle punching or pressing.

Another favorable effect resulting from the surface roughness of the fibres relates to the better moistening properties thus obtained. This stimulates liquid film formation on the fibre surfaces.

The present invention is particularly applicable for the removal of liquid particles from gas streams having flow velocities of up to 70 cm/sec through the filter material.

The filter material is advantageously employed in a form having a thickness not exceeding 10 cms e.g. in the form of one or more concentrically arranged hollow cylinders, the material being retained in this form, by means of a framework made for example from one or more layers of wire netting.

The method and apparatus according to the present invention are of particular value for the demisting of streams of corrosive gases, e.g. exhaust gases from the absorption towers in sulphuric acid plants (single or double contact processes), metal pickling fumes, brine mist from electrolytic chlorine cells and acid dried chlorine. Other gases which can advantageously be demisted in accordance with the present invention include smoke from wet air compressors (e.g. in pneumatic circuits where the air contains oil and water mists), plasticizer fumes from the moulding of plastics, exhaust gases from sulphonizing processes containing unreacted mists of organic compounds or $P_2O_5$ aerosols (e.g. in the preparation of phosphoric acid or other phosphorus compounds).

For a better understanding of the present invention, reference will now be made to the accompanying drawings which are given by way of example and wherein.

Figure 1:
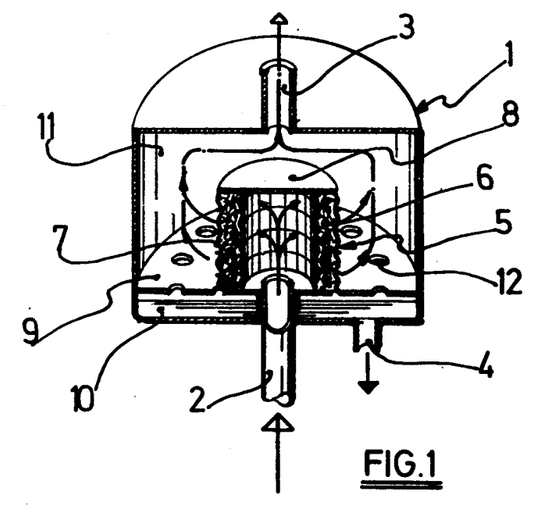
FIG. 1 is a schematic view of a demisting apparatus according to the invention.

The demisting apparatus according to the invention which is schematically shown in FIG. 1 essentially comprises a container 1 made for example from a corrosion-resistant material for filtering corrosive gas streams. This container is provided with an inlet 2 for an aerosol-loaded gas stream, and outlet 3 for the filtered gas, as well as with a discharge outlet 4 for the liquid captured in the filter. This container contains one or more filters 5, generally in the form of vertically arranged hollow cylinders. These filters contain the filter material 6, at least a portion of which has a porosity of at least 0.985, the material preferably being supported by a reinforcing wire netting 7 in the vicinity of its inner and/or outer wall. The filters are provided with a suitable cover plate 8 and are placed on for example a perforated drain plate 9 for the captured liquid. This plate may also serve as a partition between the liquid compartment and the filtered gas compartment to avoid, so far as possible contact between the filtered gas and the separated liquid.

It will be appreciated that modifications can be made to the above arrangement. Thus, for example, the gas stream may also flow through the filters in the opposite direction (in which case it is preferable to close the opening 12 located outside the circumference of the filters 5). The filters need not necessarily be cylindrical candle filters, but may have any desired polygonal cross-section in which flat filter layers are provided in an adapted manner, possibly alternated with or supported by a framework. In the vicinity of the gas inlet side, the filters may be bordered with a wire netting structure of suitable porosity. This may be useful for filtering a polydisperse aerosol. Larger droplets are then largely retained and drained away through the wire netting structure, whereas the smaller ones, particularly the submicron particles, are captured in the filter medium containing highly porous layers.

The following Examples illustrate the present invention.

To evaluate and clarify the invention and the related advantages several filters were mounted in a basic demisting arrangement as shown in FIG. 1. This arrangement is typical for demisters used in separating submicron particles. These demisters may for example be installed in chimneys. The inner diameter of the hollow cylindrical filter candles is 40 mm and the height 145 mm.

The examined filter medium generally comprises a number of superposed layers or windings of highly porous fibre webs with random fibre orientation and composed of stainless steel fibres. The fibre webs are obtained by felting the metal fibres in air suspension on a Rando-Webber machine. The characteristics of the used fibre webs are summarized in Table 1 where $d_v$ is the diameter of the web fibres ($\mu$m)
d the thickness of the web (mm)
$\epsilon$ the porosity of the web
a the specific surface of the web ($m^2.m^{-3}$).

| $d_v$ | d | $\epsilon$ | a |
|---|---|---|---|
| 4 | 10 | 0.9964 | 286 |
| 8 | 8.5 | 0.9958 | 168 |
| 12 | 6 | 0.9940 | 159 |
| 25 | 3 | 0.9880 | 152 |
| 8 | 3.5 | 0.985* | 583 |
| 8 | 3 | 0.9829** | 680 |

*needle punched webs
**sintered fibre webs

Figure 2:
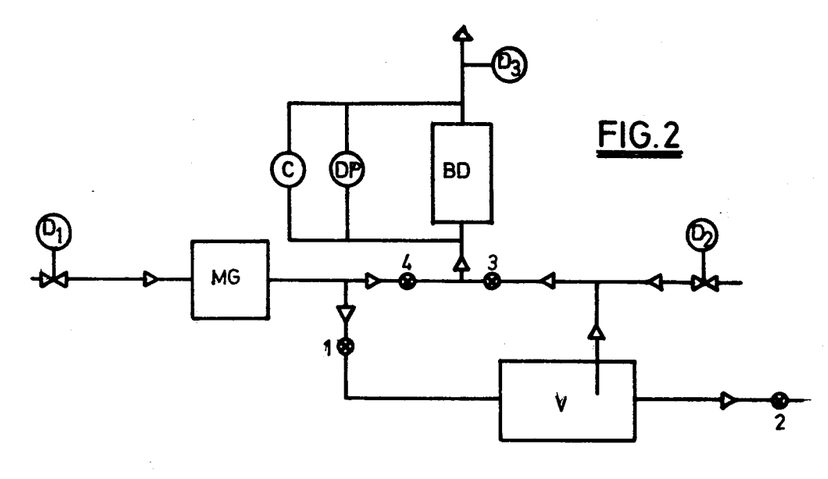
FIG. 2 is a schematic view of a test and measuring installation by means of which the characteristics of the filter materials employed according to the invention may be determined.

The test arrangement in which the demister is evaluated is further illustrated in FIG. 2. This arrangement allows one to vary the gas flow through the filter, the number and type of superposed fibre webs, the incoming particle concentration and the size distribution. The items to be measured are the gas flow rate (u), the concentration at the filter entrance $C_i$ ($cm^{-3}$) and exit $C_u$ ($cm^{-3}$) and the pressure drop $\Delta p$ (mm $H_2O$) across the filter. Nitrogen is used as a carrying gas for the liquid droplets. The nitrogen passes through a Schneider-Poelman absolute filter ("AF") of which the flow rate is set in $D_1$. The nitrogen flow is guided through a mist generator MG where it is loaded with a droplet concentration (droplet diameter $d_p$ = 0.1 ... 1 $\mu$m).

The mist generator MG is a dispersion-impact generator. The carrying gas ($N_2$) is ejected through a small pipe (0.7 mm) in the disperser head at high speed. By means of the underpressure produced in the connection pipe, the liquid ($H_2O$) to be dispersed is sucked out of the tank and pulverized. A relatively monodisperse aerosol is obtained by the action of an impactor wall placed in front of the disperser head opening. Owing to the high speed of the outstreaming gas-liquid mixture the biggest droplets will be retained by this wall and can be recirculated. The remaining liquid particles are discharged by a gas mixture flow that is forced through the chamber in which the disperser head is disposed. Measurements have shown that this mist generator produces an aerosol for paraffin with a standard deviation 1.4 and a geometric average diameter of 0.6 $\mu$m.

Depending upon the required work conditions, this flow goes either directly via 4 to the demister BD or via 1 to a dilution circuit. In the dilution vessel V the flow rate is strongly reduced and a considerable portion of droplets is allowed to settle by gravity on the bottom surface. In the axis of the vessel a pipe is provided to transfer a portion of the gas flow (in proportion to the section ratio and the pressure condition) to a secondary nitrogen flow. The pressure in the vessel is regulated by means of tap 2. In the secondary circuit, a known nitrogen flow, also absolutely filtered, $D_2$, is introduced. Together with the flow through tap 2, the loaded gas flow rate sucked out of V is determined. The result is a strongly diluted aerosol gas flow that is fed to the demister BD via tap 3.

The eventual flow rate streaming through BD is measured in $D_3$. The resistance the filter offers to this flow is determined in DP, whereas the DB inlet or outlet particle concentrations are measured in C.

The pressure drop in the filter is measured in a U-tube filled with water and connected upstream and downstream with the demister BD.

The particle concentrations are measured with a Gardner condensation nuclei counter in C. The functioning of this measuring apparatus is based on light dispersion caused by particles in a calibrated space between a source of light and a photocell. The particles act as condensation nuclei for the water in the measuring apparatus.

Tables 2 to 9 list the measuring results of several tests. They clearly show the influence of the filter parameters: filter thickness d (number of layers n), fibre diameter $d_v$ ($\mu$m) porosity and gas flow parameters; entrance concentration $C_i$ ($cm^{-3}$) and characteristic superficial gas velocity $u_k$ ($cm.s^{-1}$) on the filter performance: capture efficiency $\eta$ (%) and pressure drop $\Delta p$ (mm $H_2O$). The variables Ci, Cu and $\Delta p$ are directly readable, whereas $u_k$ and $\eta$ can be calculated with the following relations:

$$u_k = \frac{Q}{\pi D H} \text{ cm}$$

where
Q gas flow rate ($cm^3.s^{-1}$)
D inner diameter of hollow filter space (4 cm)
H height of filter cylinder (14.5 cm)

$$\eta = \left(1 - \frac{C_u}{C_i}\right) 10^2$$

The $\Delta p$-values in Tables 2 to 9 relate to gross pressure drop values across the filtering apparatus in the test rig.

TABLE 5

| Filter Parameters $d_v = 8\mu m$ $\epsilon = 0.9958$ $n - 5$ ($d \simeq 4.25$ cm) | | | | |
|---|---|---|---|---|
| $u_k$ (cm.s$^{-1}$) | 2.5 | 5 | 15.3 | 34 |
| $\Delta p$ (mm H$_2$O) | 1 | 2.5 | 18 | 55 |
| $\eta_{min}$ (%) | 85.5 | 92.5 | 80 | 73 |

TABLE 2

Filter Parameters: $d_v = 4\mu m$, $n = 10$ ($d \simeq 10$ cm), $\epsilon = 0.9964$

| $u_k$ (cm.s$^{-1}$) | 1 | | 2.5 | | 5 | | 7.5 | |
|---|---|---|---|---|---|---|---|---|
| $\Delta p$ (mm H$_2$O) | 0.8 | | 2.6 | | 4 | | 8.5 | |

| $C_i$ cm$^{-3}$ | $C_u$ cm$^{-3}$ | % $\eta$ | $C_i$ cm$^{-3}$ | $C_u$ cm$^{-3}$ | % $\eta$ | $C_i$ cm$^{-3}$ | $C_u$ cm$^{-3}$ | % $\eta$ | $C_i$ cm$^{-3}$ | $C_u$ cm$^{-3}$ | % $\eta$ |
|---|---|---|---|---|---|---|---|---|---|---|---|
| $2.5 \times 10^5$ | $2 \times 10^3$ | 99.2 | $3 \times 10^5$ | $8 \times 10^3$ | 97.3 | $10^6$ | $3.2 \times 10^4$ | 95.8 | $10^6$ | $3 \times 10^4$ | 97 |
| $3.5 \times 10^5$ | $7 \times 10^3$ | 98 | $1.6 \times 10^5$ | $2.8 \times 10^3$ | 90.2 | $5 \times 10^5$ | $2 \times 10^4$ | 96 | $7 \times 10^5$ | $2.4 \times 10^4$ | 96.6 |
| $4.5 \times 10^5$ | $10^4$ | 97.8 | $2 \times 10^5$ | $5 \times 10^3$ | 97.5 | $8 \times 10^5$ | $2.9 \times 10^4$ | 96.4 | $4.8 \times 10^5$ | $1.9 \times 10^4$ | 96.0 |
| $6 \times 10^5$ | $1.4 \times 10^4$ | 97.7 | $9 \times 10^5$ | $2.8 \times 10^4$ | 96.9 | $4 \times 10^5$ | $1.6 \times 10^4$ | 96 | $4 \times 10^5$ | $1.3 \times 10^4$ | 96.75 |
| $10^6$ | $2 \times 10^4$ | 98 | $4 \times 10^5$ | $1.4 \times 10^4$ | 97.5 | $3 \times 10^5$ | $1.3 \times 10^4$ | 95.7 | $3.5 \times 10^5$ | $9 \times 10^3$ | 97.40 |
| $8 \times 10^5$ | $1.6 \times 10^4$ | 98 | $5 \times 10^5$ | $1.7 \times 10^4$ | 96.6 | $1.5 \times 10^5$ | $6 \times 10^3$ | 96 | $2.6 \times 10^5$ | $4.5 \times 10^3$ | 98.3 |
| | | | $10^6$ | $1.5 \times 10^4$ | 98.5 | | | | $1.05 \times 10^5$ | $1.5 \times 10^3$ | 90.6 |
| $\eta_{min} = 97.5\%$ | | | $\eta_{min} = 96.25\%$ | | | $\eta_{min} = 95.75\%$ | | | $\eta_{min} = 96\%$ | | |
| 15.6 | | | 24.7 | | | 34 | | | 44.1 | | |
| 24 | | | 41 | | | 65 | | | 94 | | |

| $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % |
|---|---|---|---|---|---|---|---|---|---|---|---|
| $10^6$ | $3.6 \times 10^4$ | 96.4 | $10^6$ | $3.5 \times 10^4$ | 96.5 | $10^6$ | $3 \times 10^4$ | 97 | $10^6$ | $2.6 \times 10^4$ | 97.4 |
| $8 \times 10^5$ | $2.9 \times 10^4$ | 96.3 | $7 \times 10^6$ | $2.6 \times 10^4$ | 96.3 | $8 \times 10^5$ | $2.5 \times 10^4$ | 96.9 | $7.10^5$ | $1.9 \times 10^4$ | 97.3 |
| $6 \times 10^5$ | $2.6 \times 10^4$ | 95.7 | $5 \times 10^5$ | $2.2 \times 10^4$ | 95.6 | $6 \times 10^5$ | $1.9 \times 10^4$ | 96.8 | $5 \times 10^5$ | $1.5 \times 10^4$ | 97.0 |
| $4 \times 10^5$ | $2 \times 10^2$ | 95 | $4 \times 10^5$ | $1.6 \times 10^4$ | 96 | $5 \times 10^5$ | $1.7 \times 10^4$ | 96.6 | $4 \times 10^5$ | $1.3 \times 10^4$ | 96.7 |
| $3.8 \times 10^5$ | $1.5 \times 10^4$ | 96 | $3.5 \times 10^5$ | $1.4 \times 10^4$ | 96 | $4 \times 10^5$ | $1.5 \times 10^4$ | 96.2 | $3.8 \times 10^5$ | $10^4$ | 97.4 |
| $3.4 \times 10^5$ | $1.1 \times 10^4$ | 96.8 | $3.5 \times 10^5$ | $6.8 \times 10^3$ | 97.7 | $3.5 \times 10^5$ | $1.1 \times 10^4$ | 96.9 | $3 \times 10^5$ | $9 \times 10^3$ | 97 |
| $3 \times 10^5$ | $6 \times 10^3$ | 98 | $2.5 \times 10^5$ | $5 \times 10^3$ | 98 | $3 \times 10^5$ | $10^4$ | 96.7 | $1.8 \times 10^5$ | $6 \times 10^3$ | 96.7 |
| $1.4 \times 10^5$ | $3 \times 10^3$ | 97.8 | $1.4 \times 10^5$ | $2.5 \times 10^3$ | 98.2 | $2.5 \times 10^5$ | $7 \times 10^3$ | 97.2 | $1.5 \times 10^5$ | $4 \times 10^3$ | 97.3 |
| $5 \times 10^4$ | $10^3$ | 98 | $1.8 \times 10^5$ | $3.5 \times 10^3$ | 98 | $2 \times 10^5$ | $5 \times 10^3$ | 97.5 | $\eta_{min} = 96.7\%$ | | |
| | | | | | | $1.6 \times 10^5$ | $3.5 \times 10^3$ | | 97.8 | | |
| $\eta_{min} = 94.75\%$ | | | $\eta_{min} = 95.5\%$ | | | $\eta_{min} = 96.2\%$ | | | | | |

TABLE 3

| Filter Parameters $d_v = 4\mu m$ $\epsilon = 0.9964$ | | | | | | | | | | | |
|---|---|---|---|---|---|---|---|---|---|---|---|
| | n = 5 ($d \simeq 5$ cm) | | | | | | | n = 2 ($d \simeq 2$ cm) | | | |
| $u_k$ (cm.s$^{-1}$) | 1 | 2.5 | 5 | 7.5 | 15.6 | 24.7 | 35 | 44.1 | 7.5 | 15.6 | 24.7 | 35 |
| $\Delta_p$ (mm H$_2$O) | 0.6 | 2.5 | 3 | 6.5 | 19 | 36 | 63 | 92 | 6 | 18 | 34 | 51 |
| $\eta_{min}$ (%) | 97.75 | 96.50 | 95.5 | 95 | 93.5 | 92 | 90 | 88 | 81 | 75 | 64 | 96 |

TABLE 4

Filter Parameters $d_v = 8\ \mu m$, $n = 10$ ($d \simeq 8.5$ cm), $\epsilon = 0.9958$

| $u_k$ = 2.5 cm.s$^{-1}$ | | | 5 | | | 12 | | | 15.3 | | |
|---|---|---|---|---|---|---|---|---|---|---|---|
| $\Delta p$ = 0.8 mm H$_2$O | | | 3.0 | | | 10 | | | 14 | | |

| $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % |
|---|---|---|---|---|---|---|---|---|---|---|---|
| $5 \times 10^4$ | $10^3$ | 98 | $2 \times 10^5$ | $1.4 \times 10^4$ | 93 | $4 \times 10^5$ | $3.5 \times 10^4$ | 91.25 | $6 \times 10^5$ | $5 \times 10^4$ | 91.7 |
| $3.8 \times 10^5$ | $1.7 \times 10^4$ | 95.5 | $1.2 \times 10^5$ | $7 \times 10^3$ | 94.2 | $3.2 \times 10^5$ | $1.6 \times 10^4$ | 95 | $7.5 \times 10^5$ | $5.5 \times 10^4$ | 92.7 |
| $5.8 \times 10^4$ | $8 \times 10^2$ | 93.6 | $4.5 \times 10^5$ | $3.2 \times 10^4$ | 92.8 | $1.7 \times 10^5$ | $4.9 \times 10^3$ | 97.1 | $10^6$ | $6.5 \times 10^4$ | 93.5 |
| $4 \times 10^5$ | $2.0 \times 10^4$ | 95 | $7 \times 10^5$ | $5 \times 10^4$ | 92.8 | $1.4 \times 10^5$ | $6.5 \times 10^3$ | 95.4 | $8.10^5$ | $5.6 \times 10^4$ | 93 |
| $2.6 \times 10^5$ | $5.8 \times 10^3$ | 97.8 | $10^5$ | $7.10^4$ | 93 | $2.1 \times 10^5$ | $1.1 \times 10^4$ | 94.8 | $4.10^5$ | $3.1 \times 10^4$ | 92.2 |
| $9 \times 10^4$ | $3.5 \times 10^2$ | 99.6 | $6 \times 10^5$ | $4.5 \times 10^4$ | 92.5 | $3.5 \times 10^5$ | $2.4 \times 10^4$ | 93.1 | $3.8 \times 10^5$ | $3 \times 10^4$ | 92.1 |
| $5 \times 10^5$ | $2.7 \times 10^4$ | 94.6 | | | | $3.6 \times 10^5$ | $2.4 \times 10^4$ | 93.3 | $3 \times 10^5$ | $1.8 \times 10^4$ | 94 |
| $6.5 \times 10^5$ | $2.9 \times 10^4$ | 95.5 | | | | $4 \times 10^5$ | $3.4 \times 10^4$ | 91.5 | $2.8 \times 10^5$ | $1.5 \times 10^4$ | 94.6 |
| $8 \times 10^5$ | $3.6 \times 10^4$ | 95.5 | | | | $4.1 \times 10^5$ | $3.7 \times 10^4$ | 91 | $1.3 \times 10^5$ | $5 \times 10^3$ | 96.2 |
| | | | | | | $5.2 \times 10^5$ | $4.5 \times 10^4$ | 91.3 | $8 \times 10^4$ | $3.2 \times 10^3$ | 96 |
| | | | | | | $7 \times 10^5$ | $5.4 \times 10^4$ | 92.2 | | | |
| | | | | | | $10^6$ | $6 \times 10^4$ | 94 | | | |
| $\eta_{min} = 94.5\%$ | | | $\eta_{min} = 92.5\%$ | | | $\eta_{min} = 90.5\%$ | | | $\eta_{min} = 91\%$ | | |
| 21.1 | | | 34 | | | 56.9 | | | 79.2 | | |
| 25 | | | 60 | | | 180 | | | 212 | | |

| $C_i$ | $C_u$ | $\eta$ | $C_i$ | $C_u$ | $\eta$ | $C_i$ | $C_u$ | $\eta$ | $C_i$ | $C_u$ | $\eta$ |
|---|---|---|---|---|---|---|---|---|---|---|---|
| $10^7$ | $10^5$ | 99 | $1.4 \times 10^5$ | $8 \times 10^3$ | 94.3 | $4.5 \times 10^5$ | $7 \times 10^4$ | 84.4 | $8 \times 10^5$ | $1.2 \times 10^4$ | 98.5 |
| $5 \times 10^6$ | $7.5 \times 10^4$ | 98.5 | $2 \times 10^5$ | $1.2 \times 10^4$ | 94 | $3.8 \times 10^5$ | $5.2 \times 10^4$ | 86.3 | $5 \times 10^5$ | $10^5$ | 80 |
| $10^6$ | $5 \times 10^4$ | 95 | $1.7 \times 10^5$ | $10^4$ | 94.1 | $3.2 \times 10^5$ | $4.2 \times 10^4$ | 86.9 | $6 \times 10^5$ | $9 \times 10^4$ | 85 |
| $4 \times 10^5$ | $4 \times 10^4$ | 90 | $2.3 \times 10^5$ | $1.8 \times 10^4$ | 92.2 | $4.5 \times 10^5$ | $7.5 \times 10^4$ | 83.3 | $4.9 \times 10^5$ | $8 \times 10^4$ | 83.7 |
| $3.5 \times 10^5$ | $3 \times 10^4$ | 91.4 | $3 \times 10^5$ | $2 \times 10^4$ | 93.3 | $6.5 \times 10^5$ | $1.1 \times 10^5$ | 83.1 | $4 \times 10^5$ | $7 \times 10^4$ | 82.5 |
| $2.5 \times 10^5$ | $2 \times 10^4$ | 92 | $3.7 \times 10^5$ | $3.2 \times 10^4$ | 91.3 | $5.1 \times 10^5$ | $10^5$ | 80.4 | $3.8 \times 10^5$ | $7 \times 10^4$ | 81.6 |
| $1.5 \times 10^5$ | $1 \times 10^4$ | 92.7 | $4 \times 10^5$ | $5 \times 10^4$ | 87.5 | $8 \times 10^5$ | $10^5$ | 87.5 | $3.7 \times 10^5$ | $6 \times 10^4$ | 83.8 |
| $1.1 \times 10^5$ | $6 \times 10^3$ | 94.5 | $5.1 \times 10^5$ | $6 \times 10^4$ | 88.2 | $5.5 \times 10^5$ | $1.1 \times 10^5$ | 80 | $3.8 \times 10^5$ | $5 \times 10^4$ | 86.8 |
| $6 \times 10^4$ | $3 \times 10^3$ | 95 | $5.5 \times 10^5$ | $6.8 \times 10^4$ | 87.6 | $4 \times 10^5$ | $8 \times 10^4$ | 80 | $3.5 \times 10^5$ | $4 \times 10^4$ | 88.6 |
| $4 \times 10^4$ | $2.5 \times 10^3$ | 93.8 | $8 \times 10^5$ | $9 \times 10^4$ | 88.75 | $2.5 \times 10^5$ | $2.2 \times 10^4$ | 91.2 | $3 \times 10^5$ | $3.5 \times 10^4$ | 83.3 |
| $2.5 \times 10^4$ | $1.9 \times 10^3$ | 92.4 | $7.5 \times 10^5$ | $7.3 \times 10^4$ | 90.3 | | | | $2.4 \times 10^5$ | $3 \times 10^4$ | 87.5 |
| $7 \times 10^4$ | $3.5 \times 10^3$ | 95 | $10^6$ | $7.6 \times 10^4$ | 92.4 | | | | | | |
| $5 \times 10^5$ | $3.1 \times 10^4$ | 93.8 | | | | | | | | | |
| $4 \times 10^4$ | $2.8 \times 10^3$ | 93 | | | | | | | | | |
| $3 \times 10^4$ | $1.7 \times 10^3$ | 94.3 | | | | | | | | | |

TABLE 4-continued

| Filter Parameters $d_v = 8\ \mu m$, $n = 10$ ($d \simeq 8.5$ cm), $\epsilon = 0.9958$ | | | |
|---|---|---|---|
| $\eta_{min} = 90\%$ | $\eta_{min} = 87.5\%$ | $\eta_{min} = 80\%$ | $\eta_{min} = 79\%$ |

TABLE 6

Filter Parameters: $d_v = 12\mu m$ $\epsilon = 0.9940$

| $n = 8$ ($d \simeq 4.8$ cm) | | | | | | | | $5$ ($d \simeq 3$ cm) | | | | |
|---|---|---|---|---|---|---|---|---|---|---|---|---|
| $u_k$ (cm.s$^{-1}$) | 2.5 | 5 | 10 | 12.5 | 15 | 17.5 | 20 | 22.5 | 2.5 | 5 | 7.5 | 10 | 15 | 20 |
| $\Delta p$ (mm H$_2$O) | 1.5 | 2.6 | 7.5 | 9 | 14 | 18 | 23.5 | 27 | 1.5 | 2.5 | 6.5 | 8.75 | 14.5 | 19.5 |
| $\eta_{min}$ (%) | 93.5 | 92 | 85.5 | 85 | 81.5 | 79.5 | 76.5 | 75 | 93.5 | 90 | 85 | 81.5 | 65.5 | 57 |

TABLE 8

Filter Parameters: combined filter $n_3 + n_4 + n_5$ ($d_3 + d_4 + d_5 \simeq 7.9$ cm)

where $n_3 = 4 \rightarrow d_v = 12\mu m$
$n_4 = 3 \rightarrow d_v = 8\mu m$
$n_5 = 3 \rightarrow d_v = 4\mu m$

| $u_k$ (cm.s$^{-1}$) | 1 | 4.5 | 10 | 15 | 20 |
|---|---|---|---|---|---|
| $\Delta p$ (mm H$_2$O) | 0.6 | 3 | 8 | 16.5 | 24 |
| $\eta_{min}$ (%) | 97.5 | 98.2 | 98.2 | 96.5 | 96.2 |

TABLE 7

Filter Parameters: combined filter $n_1 + n_2$ ($d_1 + d_2 \simeq 9.25$ cm)
where $n_1 = 5 \rightarrow d_v = 8\mu m$
$n_2 = 5 \rightarrow d_v = 4\mu m$

| $u_k$ 6.7 cm.s$^{-1}$ | | | 15.6 | | | 34 | | |
|---|---|---|---|---|---|---|---|---|
| $\Delta p$ 6 mm H$_2$O | | | 17 | | | 58 | | |
| $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % |
| $10^6$ | $4 \times 10^4$ | 96 | $10^6$ | $3.8 \times 10^4$ | 96.2 | $5 \times 10^5$ | $4.10^4$ | 95 |
| $9 \times 10^5$ | $3.8 \times 10^4$ | 95.8 | $6 \times 10^5$ | $2.8 \times 10^4$ | 95.3 | $10^6$ | $4.5 \times 10^4$ | 95.5 |
| $5 \times 10^5$ | $2 \times 10^4$ | 96 | $8 \times 10^5$ | $3.1 \times 10^4$ | 96.1 | $6 \times 10^5$ | $3.8 \times 10^4$ | 93.7 |
| $7 \times 10^5$ | $3 \times 10^4$ | 95.7 | $4 \times 10^5$ | $2.2 \times 10^4$ | 94.5 | $4 \times 10^5$ | $3 \times 10^4$ | 92.5 |
| $3.5 \times 10^5$ | $1.1 \times 10^4$ | 96.8 | $3.5 \times 10^5$ | $1.5 \times 10^4$ | 95.7 | $3.5 \times 10^5$ | $2.4 \times 10^4$ | 93.1 |
| $2.5 \times 10^5$ | $4 \times 10^3$ | 98.4 | $2.8 \times 10^5$ | $7 \times 10^3$ | 97.5 | $3 \times 10^3$ | $1.5 \times 10^4$ | 95 |
| $1.7 \times 10^5$ | $2.5 \times 10^3$ | 93.5 | $1.7 \times 10^5$ | $3 \times 10^3$ | 98.2 | $2.5 \times 10^5$ | $9 \times 10^3$ | 96.4 |
| | | | $1.3 \times 10^5$ | $2 \times 10^3$ | 98.4 | $2 \times 10^5$ | $5 \times 10^3$ | 97.4 |
| | | | | | | $10^5$ | $2.5 \times 10^3$ | 97.5 |
| $\eta_{min} = 95.7\%$ | | | $\eta_{min} = 94.25\%$ | | | $\eta_{min} = 92.50\%$ | | |

TABLE 9

Filter Parameters: needle punched filter where $d_v = 8\mu m$
$n = 10$ ($d \simeq 3.5$ cm)
$\epsilon = 0.985$

| $u_k = 2.5$ cm.s$^{-1}$ | | | 5 | | | 7 | | | 15.6 | 24.5 | 34 |
|---|---|---|---|---|---|---|---|---|---|---|---|
| $\Delta p = 1.0$ mm H$_2$O | | | 5 | | | 9 | | | 16.9 | 28 | 30 |
| $C_i$ cm$^{-3}$ | $C_u$ cm$^{-3}$ | $\eta$ % | $C_i$ cm$^{-3}$ | $C_u$ cm$^{-3}$ | $\eta$ % | $C_i$ cm$^{-3}$ | $C_u$ cm$^{-3}$ | $\eta$ % | | | |
| $4 \times 10^5$ | $2.5 \times 10^4$ | 93.7 | $8 \times 10^5$ | $4 \times 10^4$ | 95 | $10^6$ | $4.5 \times 10^4$ | 95.5 | | | |
| $7 \times 10^5$ | $5 \times 10^4$ | 92.9 | $7 \times 10^5$ | $3.7 \times 10^4$ | 94.7 | $6 \times 10^5$ | $4 \times 10^4$ | 93.3 | | | |
| $9 \times 10^5$ | $6 \times 10^4$ | 93.3 | $10^6$ | $4.3 \times 10^4$ | 95.7 | $4 \times 10^5$ | $3 \times 10^4$ | 92.5 | | | |
| $3.5 \times 10^5$ | $2.2 \times 10^4$ | 93.7 | $3.5 \times 10^5$ | $1.1 \times 10^4$ | 96.9 | $3.2 \times 10^5$ | $1.9 \times 10^4$ | 94 | | | |
| $2.8 \times 10^5$ | $1.1 \times 10^4$ | 96.0 | $4.5 \times 10^5$ | $2 \times 10^4$ | 95.5 | $2.2 \times 10^5$ | $8 \times 10^3$ | 96.4 | | | |
| $2 \times 10^5$ | $6 \times 10^3$ | 97.0 | $1.5 \times 10^5$ | $4 \times 10^3$ | 97.3 | $1.8 \times 10^5$ | $6 \times 10^3$ | 96.7 | | | |
| | | | $2.5 \times 10^5$ | $10^4$ | 96 | $1.3 \times 10^5$ | $3.5 \times 10^3$ | 97.3 | | | |
| $\eta_{min} = 92.7$ | | | $\eta_{min} = 94.5$ | | | $\eta_{min} = 92.2$ | | | 95 | 94.5 | 94 |

Figure 3A:
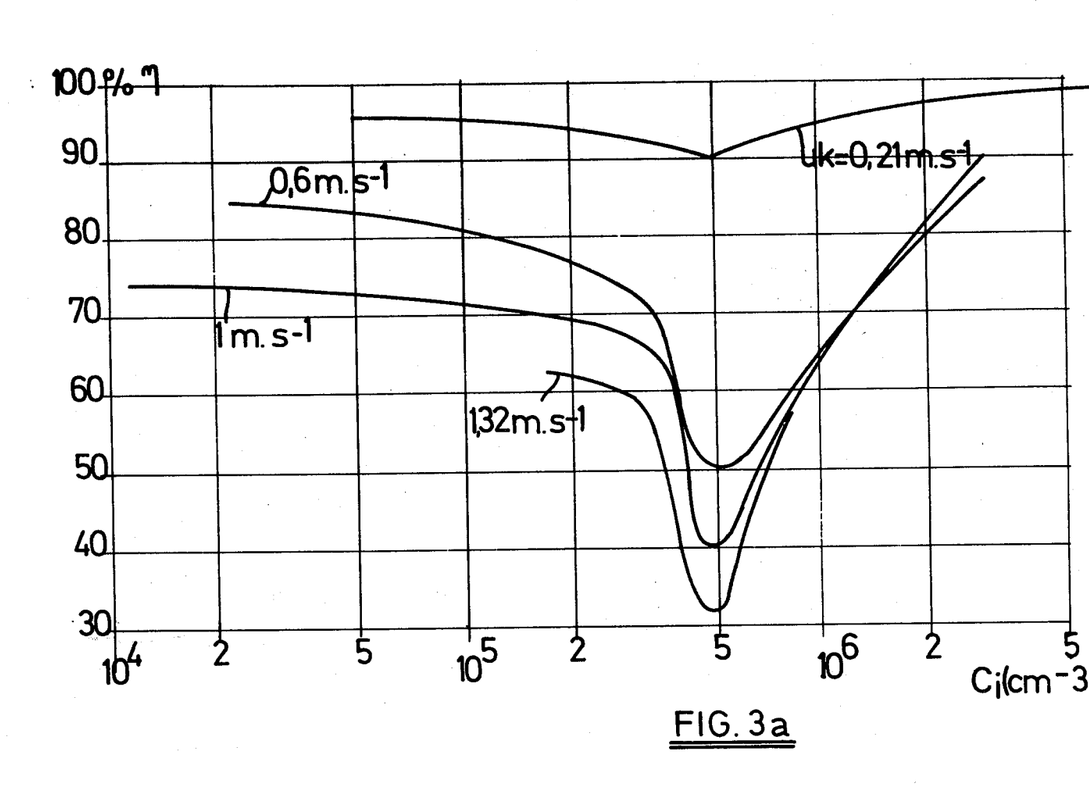
FIG. 3a shows the relation between capture efficiency and inlet concentration for a filter composed of 10 superposed webs of stainless steel fibres with a fibre diameter of 8 $\mu$m and with the gas flow rate as a parameter.
Figure 3B:
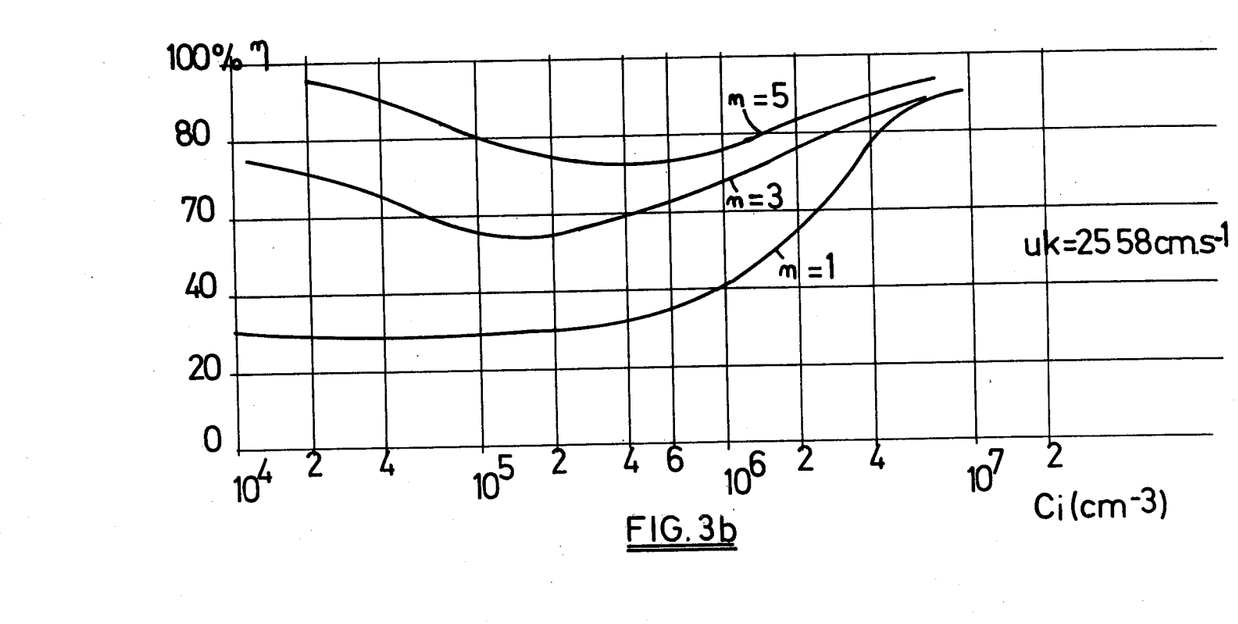
FIG. 3b shows the same relation at a definite gas flow rate and with the filter thickness as a parameter (with 5, 3 and 1 fibre web(s) of stainless steel fibres with a diameter of 8 $\mu$m)

The inlet concentration values are always taken between $10^5$ cm$^{-3}$ and $10^6$ cm$^{-3}$, since it is established that the capture efficiency of the filters, used in the present test arrangement are always at a minimum for this concentration range and at gas velocities not exceeding 70 cm.s$^{-1}$ (capture mechanism predominantly governed by diffusion). This is further illustrated by FIGS. 3a and 3b which plot the relation $C_i - \eta$ for different layer thicknesses and several gas velocities. The minimum becomes more pronounced when the gas velocity rises. The overall capture efficiency is indeed governed by the interaction of three phenomena: coagulation, particle capture and entrainment. Coagulation is a process governed by contact time and concentration according to the relation $C/C_o = e^{-kt}$, where C is the present and $C_o$ the inlet concentration and k the coagulation constant which has experimentally been found to depend on the particle size and the turbulence of the gas flow.

Particle capture as an irreversible process is described by the relation $$\eta = f(\psi, R, Pe, Re, \epsilon)$$

where $\psi$ is the impact parameter (determinant for capture through inertial collision, i.e. at high gas velocities).

$R = d_p/d_v$ is the interception parameter with $d_p$ as particle diameter, $Pe = u\ d_v/D$ is the Peclet number with $D = (C_s k_B T)/3\pi\mu d_p)$ as diffusion coefficient where $C_s$ is the Cunningham slip correction factor, $k_B$ the Boltzman constant and $\mu$ the gas viscosity.

$Re = u\ d_v\rho/\mu$ is the Reynolds number with $\rho$ as the gas density.

At low gas velocities the inverse Peclet number is the parameter governing the capture mechanism (diffusion).

A third factor influencing capture efficiency is the entrainment caused by local hindering of particles in the neighborhood of the individual filter fibres and local flow changes in the erratic pore space leading to changes in capture conditions (t, Re).

It is generally accepted that with increasing $C_i$ the efficiency will rise on account of coagulation, remain constant on account of particle capture and decrease as a result of entrainment. At shorter contact times (high gas velocity u and/or small filter thickness) the contribution of coagulation to the overall capture efficiency will be negligible. At a certain (critical) inlet concentration $C_i = \ldots 10^5$ cm$^{-3}$ the entrainment tendency will get the upper hand on capture and even increase with increasing gas velocity; as a result efficiency will diminish. The coagulation has an impact, when the inlet concentration exceeds this critical value, particularly at lower gas speeds. In case of short contact times, higher gas speeds and/or smaller filter thicknesses, it is established that the efficiency also increases with rising $C_i$. This can be explained by the fact that the capture-determining mechanism moves from diffusion to inertial interception or inertial collision, which mechanism is exactly stimulated by high gas velocities.

As from now a minimum efficiency $\eta_{min}$ is accepted as characteristic capture efficiency for a filter. (The $\eta_{min}$ values are always determined by graphic interpolation in a graph $\eta - C_i$). This choice constitutes a safety margin in the general evaluation. For real demisting regimes the capture efficiency will thus never deviate unfavorably from the $\eta_{min}$ values given in the tables.

It should also be observed that the values represent efficiency based on number of particles. There values will be lower than the corresponding mass efficiency values $$\eta_m = (1 - \frac{C_{m.u}}{C_{m.i}}) \, 10^2, \text{ where } C_m = C \frac{\pi \bar{d}_p^3}{6} \rho_L,$$

$\bar{d}_p$ the mean particle diameter and $\rho_L$ the liquid viscosity. A number of the particles at the inlet (diameter $d_p$, i) that are not captured will indeed be broken down to particles with a smaller diameter $d_p$, u so that in $$\eta_m = 10^2 - (10^2 - \eta) \frac{\bar{d}_p^3 \, u}{\bar{d}_p^3 \, i}$$

we will always have $\eta m > \eta n$.

Particle number efficiencies of 95% are consequently comparable with weight retentions ($\eta_m$) largely exceeding 99%.

Figure 4A:
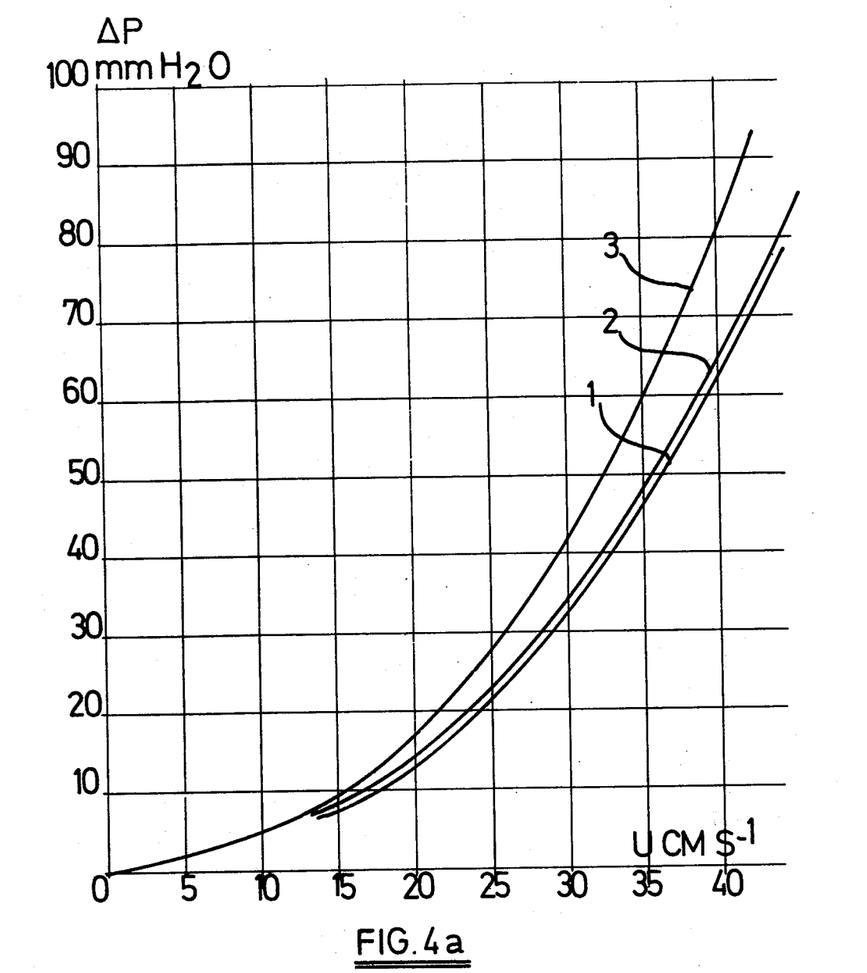
FIG. 4a shows the pressure drop characteristics ($\Delta p$ — u relation) in an empty filter installation, and provided with one fiber layer of 8 $\mu$m fibres, through which respectively a dry and aerosol-loaded gas stream flows.
Figure 4B:
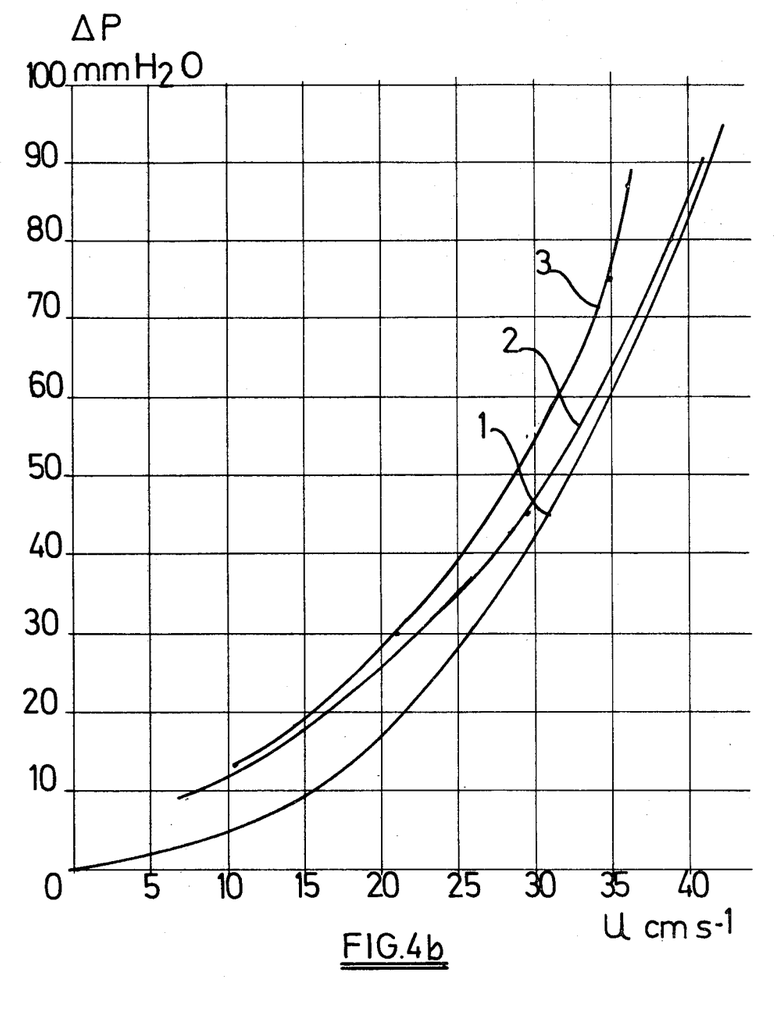
FIG. 4b shows analogous pressure drop characteristics using respectively 3 and 5 web layers and an aerosol-loaded gas stream.

The tables also give the relation between u and $\Delta_p$ for various filter configurations. These relations, called pressure drop characteristics, are plotted in FIGS. 4a and 4b. Pressure drop being an important parameter for operating costs and hence for the economic value of the filter as a demisting medium, a critical evaluation of the filter properties, particularly capture efficiency as a function of pressure drop, is important. FIG. 4a gives, as a function of u, the pressure drop across the empty filter installation (without incorporated filter) (curve 1), and the installation under application of one web layer of 8 $\mu$m fibres (thickness 8.5 mm) through which dry nitrogen flows (curve 2) and finally through which a mixed gas stream ($C_i > 10^8$ cm$^{-3}$) (curve 3) flows. FIG. 4b gives the influence of the filter thickness on the pressure drop. Curve 1 is identical to curve 3 of FIG. 4a, whereas curves 2 and 3 illustrate the increasing pressure drop for 3 and 5 layers respectively of 8 $\mu$m fibres.

Generally it can be said that pressure drop rises with increasing gas velocity, fibre diameter, filter density, filter thickness (number of web layers), mist concentration, gas density and gas velocity. In the demisting process, the total pressure drop may be considered as a result of two cummulative phenomena. The first is the contribution of viscous and turbulent energy losses of the gas due to friction with the fibre walls and meeting the relation $\Delta_p = Au + Bu^2$, where A and B are coefficients that are to be experimentally determined. The examined range of gas velocities corresponds with the laminar speed range and a portion of the turbulent speed range. The term Au gives the laminar flow according to Darcy's law and is predominant until the critical Reynolds number is reached. As from Re$_{crit}$ the influence of the turbulent flow, where kinetic energy losses occur, rapidly rises. This contribution to $\Delta_p$ is expressed as Bu$^2$.

The second phenomenon relates to the real reduction in free spaces in the filter texture during demisting due to the formation of a liquid film around the fibres. However, the effect of this pore reduction in the filter medium of the invention is minimal owing to the particularly high initial porosity of the fibre webs used.

Figures 5, 7:
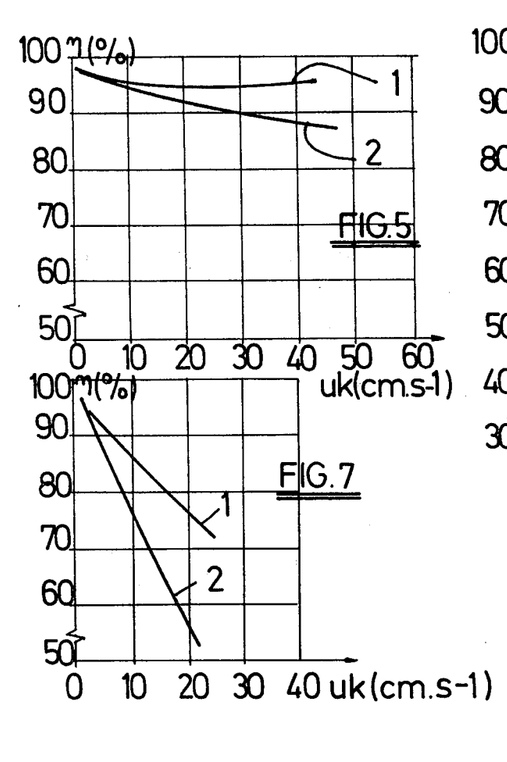
FIGS. 5, 6 and 7 show the $\eta_{min}$ $u_k$-relations for filters with fibre webs of 4 $\mu$m, 8 $\mu$m and 12 $\mu$m fibres respectively and for various filter thicknesses, whereas FIGS. 8 and 9 give these relations for respectively filters composed of combined fibre webs with different fibre diameters, and filters composed of fibre webs densified by needle punching.
Figure 6:
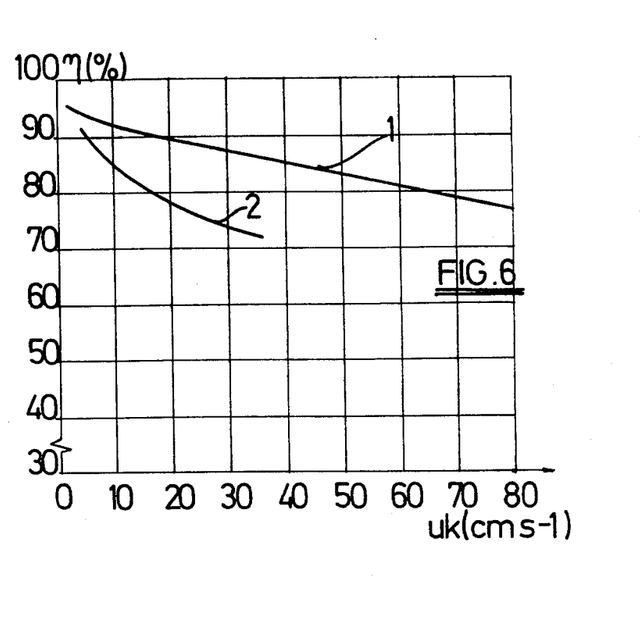

FIGS. 5, 6 and 7 plot the results of Tables 2 and 3, 4 and 5 and 6, respectively. The curves 1 relate to the capture efficiencies of thicker filters (ten web layers for filters of 4 $\mu$m and 8 $\mu$m fibres; FIGS. 5 and 6: eight layers for filters of 12 $\mu$m fibres: FIG. 7). The curves 2 relate to the capture efficiencies for thinner filters (three web layers). The characteristic minimum capture efficiency considerably decreases with increasing gas velocity and with decreasing filter thickness, i.e. with shorter contact times. It is also established that smaller fibre diameters have a favorable effect on capture efficiency.

Figure 10:
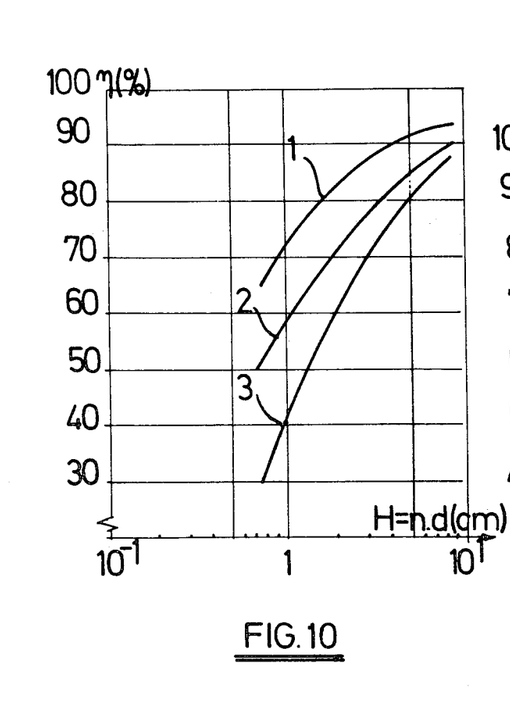
FIG. 10 shows the relation between capture efficiency and filter thickness for a filter composed of 8 $\mu$m fibres.
Figure 11:
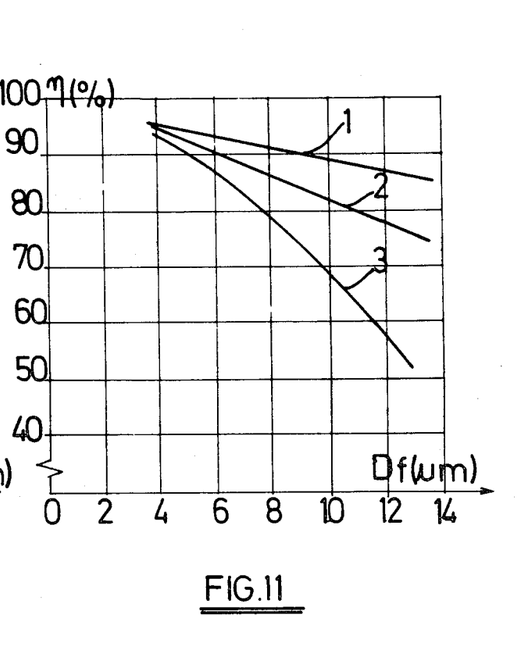
FIG. 11 shows the influence of the fibre diameter in the filter on the capture efficiency and is derived from FIGS. 5 to 7.

FIGS. 10 and 11 have been added to clarify both phenomena. It can be derived from FIG. 10 that for a filter medium of 8 $\mu$m fibres the gain in capture efficiency as a result of the increase of the filter thickness beyond 10 cm is relatively small and less sensitive to as velocity changes. A filter thickness of ca. 10 cm for 8 $\mu$m fibres thus seems to be optimal. Filter thicknesses of the same magnitude may be accepted for other fibre diameters. On the other hand, FIG. 11 clearly shows that filter media with a fibre diameter of 4 $\mu$m are to be preferred for five layers, whereby the applied gas velocity has practically no impact. Table 4 shows that when the number of layers is set at ten, also 8 $\mu$m fibres still guarantee an appropriate efficiency ($\eta_{min} > 90\%$), so that generally fibre diameters not exceeding 10 $\mu$m are to be preferred.

Figure 8:
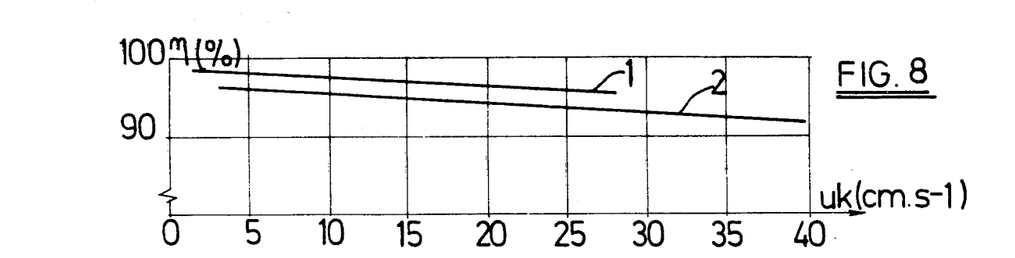

The results of Tables 7 and 8 are plotted in FIG. 8. The application of combined filters is clearly advantageous to capture efficiency for a wide range of gas velocities. Curve 1 relates to a filter composed of superposed web layers : viz. four web layers of 12 $\mu$m fibres near the filter inlet side, next to this three web layers of 8 $\mu$m fibres and as a bordering near the filter outlet side another three layers of 4 $\mu$m fibres. The fibre diameter thus decreases from inlet to outlet side and the total filter thickness is ca. 7.9 cm. The efficiency of this filter construction is higher than for a filter of five web layers with a fibre diameter of 8 $\mu$m near the filter inlet side and bordered by five web layers with a fibre diameter of 4 $\mu$m near the outlet side (curve 2), although the total filter thickness here amounts to 9.25 cm. These high efficiencies are a result of the selective capture efficiencies of the different fibres in the filter.

Figure 9:
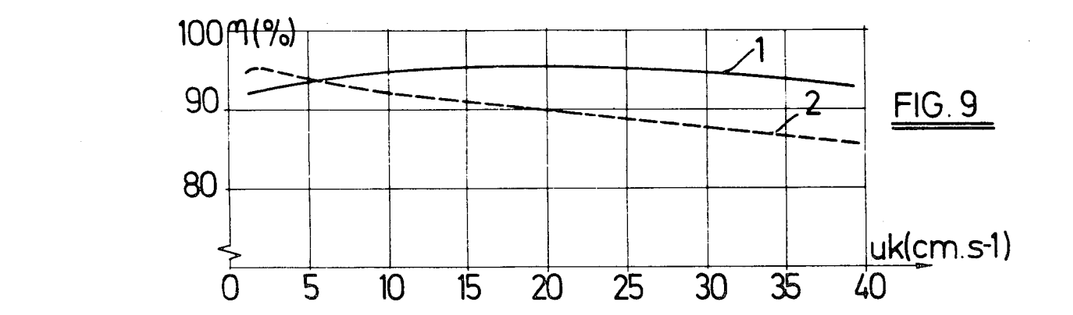

Finally in FIG. 9, curve 1 illustrates the greater efficiency of fibre webs of 8 μm fibres densified by needle punching as compared with th same quantity of fibre webs not densified by needle punching (in both cases ten layers) of 8 μm fibres (dotted line 2). Moreover, this efficiency increase is accompanied by smaller pressure drop losses due to the smaller filter thickness resulting from the densification. This can also be derived from a comparison between Tables 4 and 9. In practice this means that filters composed of needled webs combine high capture performance and low operating cost (low pressure drop) with a minimum filter volume (and hence minimum installation volume), which constitutes an additional advantage of the invention.

Figure 12:
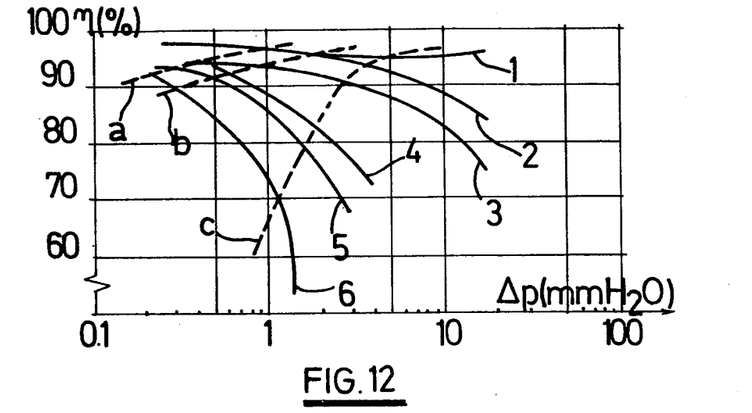
FIGS. 12 and 13 plot the variation of $\eta$ vs. the net pressure drop $\Delta p$.
Figure 13:
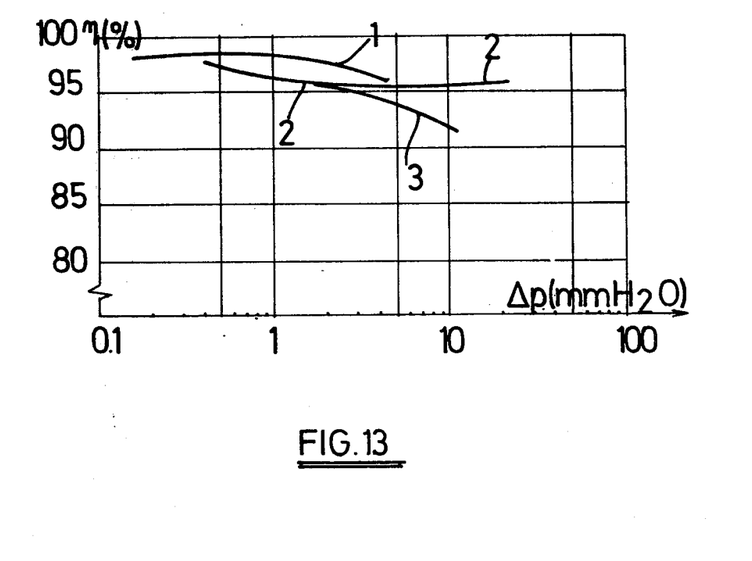

To demonstrate the economic advantages, particularly the low operating costs (low $\Delta_p$) of the filters according to the invention, reference is made to the graphs in FIGS. 12 and 13 where the relation between capture efficiency and net pressure drop across the filter is clearly shown. Curves 1 and 2 in FIG. 12 give the variation for a filter medium of ten and five web layers respectively with a fibre diameter of 4 μm, whereas curves 3 and 4 relate to a filter medium of ten and five web layers respectively with a fibre diameter of 8 μm and curves 5 and 6 relate to filter media of eight and five web layers respectively with a fibre diameter of 12 μm. The dotted lines a, b and c represent constant gas velocity: 2.5 cm s$^{-1}$, 5 cm s$^{-1}$, and 15 cm s$^{-1}$ respectively. The efficiencies are definitely unfavorable for 12 μm fibres and for thinner filters of 8 μm fibres (curve 4).

FIG. 13 shows that combined demisters favor pressure drop. Curve 1 relates to the combination of four web layers with $d_v = 12$ μm, three web layers with $d_v = 8$ μm and three web layers with $d_v = 4$ μm, whereas curve 3 gives the relation for a web combination of five web layers with $d_v = 8$ μm and five web layers with $d_v = 4$ μm. Curve 2 corresponds with curve 1 of FIG. 12.

While this invention has been described, it will be understood that it is capable of further modification which relate e.g. to constructive features of the apparatus such as the arrangement of inlet and outlet means, the shape and number of filters arranged in the housing etc. It is e.g. possible to arrange a number of concentric candle filters in the housing with concentric free spaces therebetween and which filters are passed consecutively by the gas stream to enable e.g. a selective separating effect. Similarly in a horizontal duct line one or more intermediate chambers with larger diameters can be arranged in which chambers a number of substantially flat filter media with free spaces therebetween can be arranged perpendicularly to the gas flow. The fiber diameter in the subsequent filter media decreases preferably according to the direction of the gas flow. The first part of the chamber at the gas inlet side has preferably a conical shape widening in the direction of the gas flow, so that the gas speed decreases. The area of the subsequent filtering media increases e.g. in conformity with the conusshaped part of the chamber. The second part of the chamber connects then the first part with the gas outlet side in a appropriate way. Obviously suitable outlets are arranged at the bottom of the filter media to drain the captured liquid. The filter medium which is crossed first by the mist loaden gas stream can also function as a coalescing means. The application is thus intended to cover any variations, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What we claim is:

1. Filtration apparatus for the removal of liquid particles from a stream of gas comprising filtration means including a plurality of adjacent non-woven metal fiber webs, means for passing a stream of gas containing liquid particles at least some of which are of submicron dimensions through said filter means at a velocity of less than 70 cm/sec, means for removing from said filtration means said stream of gas from which at least some of said particles including at least some of said submicron particles have been removed, and outlet means for the removed liquid, the diameter of the fibers in successive ones of said webs decreasing in the direction of flow of the gas stream, said filtration means having a porosity of at least 0.985 and being moistenable by said liquid particles.

2. Apparatus as in claim 1 and wherein said filtration means has a porosity of 0.99 during filtration.

3. Apparatus as claimed in claim 1 wherein the said filter material has a porosity of at least 0.995.

4. Apparatus as claimed in claim 1 wherein said metal fibers are stainless steel fibres.

5. Apparatus as claimed in claim 1 wherein the webs comprise fibers having a rough surface.

6. Apparatus as claimed in claim 1 wherein the filter material has a thickness not exceeding 10 cms.

7. Apparatus as claimed in claim 1 wherein the filter material is in the form of concentrically arranged hollow cylinders having concentric free spaces therebetween.

8. Apparatus as claimed in claim 7 wherein the filter material is retained by means of a framework of wire netting.

9. Apparatus as claimed in claim 1 wherein the web comprises fibres having a diameter of 1 to 50μ.

10. Apparatus as claimed in claim 9 wherein the web comprises fibres having a diameter of 1 to 10μ.

11. A method for filtering a stream of gas at high efficiency for removing liquid particles at least some of which are of submicron dimensions therefrom comprising passing the stream of gas at a velocity of less than 70 cm/sec through a filter material comprising a plurality of adjacent non-woven metal fiber webs moistenable by said liquid particles, the diameter of the fibres in successive webs decreasing in the direction of flow of the gas stream and the webs having a porosity of at least 0.985 whereby at least some of said particles including at least some of said submicron particles are removed from the gas stream, and removing captured liquid from the filter material.

12. A method as in claim 11 and wherein said filter material has a porosity of 0.985 during filtration.

13. A method as in claim 11 and wherein said filter material has a porosity of at least 0.995.

14. A method as in claim 11 and wherein said fibers are stainless steel fibers.

15. A method as in claim 11 and wherein said fibers have a rough surface.

16. A method as in claim 11 and wherein said fibrous web has been needle punched or pressed.

17. A method as in claim 11 and wherein said fibrous web has a thickness not greater than 10 cm.

18. A method as in claim 11 and wherein said filter material is in the form of concentrically arranged hollow cylinders having concentric free spaces therebetween.

19. A method as in claim 18 and wherein said filter material includes a framework of wire netting for retaining said filter material.

20. A method as in claim 11 and wherein said fibers have a diameter of 1 to 50μ.

21. A method as in claim 20 and wherein said fibers have a diameter of 1 to 10μ.

* * * * *

UNITED STATES PATENT AND TRADEMARK OFFICE
CERTIFICATE OF CORRECTION

PATENT NO. : 4,144,040
DATED : March 13, 1979
INVENTOR(S) : Jozef Claes and Roger De Bruyne It is certified that error appears in the above-identified patent and that said Letters Patent are hereby corrected as shown below:

On the cover page, Section "[73]" please correct the same to read:

Assignee: N. V. Bekaert S. A., Zwevegem, Belgium

*Signed and Sealed this*

*Twenty-fourth* Day of *July 1979*

[SEAL]

Attest:

*Attesting Officer*

LUTRELLE F. PARKER
*Acting Commissioner of Patents and Trademarks*